United States Patent [19]
Saito et al.

[11] Patent Number: 4,959,665
[45] Date of Patent: Sep. 25, 1990

[54] LASER PRINTER WITH HARMONIC WAVE SEPARATION OF THE BEAM

[75] Inventors: Susumu Saito, Hachiouji; Akira Arimoto, Kodaira, both of Japan

[73] Assignees: Hitachi Koki Co., Ltd.; Hitachi, Ltd., both of Tokyo, Japan

[21] Appl. No.: 393,888

[22] Filed: Aug. 15, 1989

[30] Foreign Application Priority Data

Sep. 9, 1988 [JP] Japan ................. 63-224673

[51] Int. Cl.⁵ ............... G01D 9/00; G01D 15/14; H01S 3/10
[52] U.S. Cl. .................. 346/108; 346/160; 372/22; 307/427
[58] Field of Search ........... 346/108, 107 R, 160; 372/22, 24; 307/427

[56] References Cited

U.S. PATENT DOCUMENTS 4,824,220 4/1989 Yamamoto et al. ............ 372/22
4,830,447 5/1989 Kamiyama et al. ............ 350/96.12

FOREIGN PATENT DOCUMENTS 61-50122 3/1986 Japan .
63-66527 3/1988 Japan .
63-121829 5/1988 Japan .

OTHER PUBLICATIONS

Handbook of Lasers with Selected Data on Optical Technology, Chemical Rubber Co., 1971, "Non-Linear Optical Materials", S. Singh, pp. 489–492.

*Primary Examiner*—Mark J. Reinhart
*Attorney, Agent, or Firm*—Fay, Sharpe, Beall, Fagan, Minnich & McKee

[57] ABSTRACT

In an information device which has a laser light source and a non-linear optical crystal for converting the laser fundamental wave light irradiated from the laser light source into harmonic wave light and uses the laser light passing through the non-linear optical crystal, a prism or an optical grating is provided to separate an optical path of the fundamental wave light remaining in the laser light passing through the crystal from an optical path of the harmonic wave light with the purpose of eliminating the fundamental wave light. In another embodiment, a polarization filter is provided to eliminate the fundamental wave light.

15 Claims, 4 Drawing Sheets $$d_1 = \frac{\pi f \lambda_1}{4D}$$

$$d_2 = \frac{\pi f \lambda_2}{4D} = \frac{\pi f \lambda_1}{8D}$$

ial wave light whose intensity is about several ten (10)

LASER PRINTER WITH HARMONIC WAVE SEPARATION OF THE BEAM

BACKGROUND OF THE INVENTION

The present invention relates to an information device using laser light, for example, a laser printer and optical disc device.

The laser printer and optical disc device are information devices that realize highly fine picture images and high density memory utilizing the nature that laser light can be focused into a minute point. In this case, a diameter of a laser light spot is determined depending upon the wavelength of the laser light, and the shorter the wavelength, to the smaller the value of the laser light that can be focused. For this reason, shortening of the wavelength of laser light is one of the most influential means for realizing further high-resolution printing and high-density recording.

The conversions of light wavelengths by non-linear optical effects are used for shortening a wavelength of laser light. In these, a second harmonic wave generation process is well known frequency of an output light beam of a laser oscillator is doubled. In this case, since the wavelength of the second harmonic wave light becomes half of that of the output beam of the laser oscillator, the diameter of the spot of the second harmonic wave light can be readily focused to about half the size of that of an output beam of a laser oscillator. An information device in which the second harmonic wave light of an output beam of a laser oscillator is used, for example a laser printer, is shown in Japanese patent application Laid-Open No. 63-66527.

In this example, the beam output from the semi-conductor laser is irradiated onto an element of conversion of light wavelength made of a non-linear optical crystal to be converted into harmonic wave light, and the beam whose light wavelength was converted is irradiated onto a photoconductive drum as it is.

The conversion efficiency of an output beam of a laser oscillator (fundamental wave) into the second harmonic wave light is proportional to the value determined by the non-linear optical constant of the crystal for an element of conversion of light wavelength used and to the square of the energy density of the fundamental wave light. When such a crystal available at present as $LiNbO_3$, $KNbO_3$, $KTiPO_4$, $KH_2PO_4$, $LiIO_3$, $Ba_2NaNb_5O_{15}$, and so on, is used, and even if the fundamental wave light whose intensity is about several ten (10) $kW/cm^2$ through $MW/cm^2$ is irradiated on the crystal, the fundamental wave can not be completely converted into the second harmonic wave. Therefore, fundamental wave light remains in the second harmonic wave light after the conversion.

The application of laser light to information devices under such conditions, therefore, will not serve to realize the micronization, that is an object, of a diameter of a laser light spot, and as a result high-resolution printing and high-density recording may not be realized.

An optical disc device having an optical filter for removing a fundamental wave light component from a light beam in which the fundamental wave light mixes with the second harmonic wave light is described in Japanese patent application Laid-Open No. 61-50122. Moreover, a harmonic wave light generator comprising a semiconductor laser, a non-linear optical crystal and an optical filter for removing a fundamental wave light component from a light beam in which the fundamental wave light and the second harmonic wave light mingle together is described in Japanese patent application Laid-Open No. 63-121829. However, since the optical filters described in the above literature are made from an absorptive optical material or a dielectric multi-layer coating, and since these optical filters generally have a fundamental wave light transmission factor of 0.1% to 0.2% or more, it is difficult to sufficiently eliminate the fundamental wave light by use of these optical filters. Therefore, the use of these kinds of optical filters will not serve to realize the micronization of the spot diameter of a laser light beam, and as a result, high-resolution printing and high-density recording will not be accomplished.

SUMMARY OF THE INVENTION

An object of the present invention is to provide an information device having an optical system in which a fundamental wave light component is sufficiently eliminated therefrom.

According to the present invention, in order to accomplish the above object, there is provided a dispersive optical element for changing the optical paths of the fundamental wave light and the harmonic wave light in such a manner that each of the optical paths of the fundamental wave light and the harmonic wave light differs from each other, or a polarization optical component which will not transmit fundamental wave light depending upon the difference between the linear polarization directions of the fundamental wave light and harmonic wave light, in the optical path of the light beam converted thereinto by an optical element for wavelength conversion.

By means of aforementioned arrangement, the fundamental wave light (wavelength: $\lambda_1$) which still remains in the second harmonic wave light (wavelength: $\lambda_2 = \frac{1}{2}\lambda_1$) after passing through the element for wavelength conversion can be eliminated. Therefore, the light beam can be focused to the spot with the diameter determined by only the second harmonic wave light on a photo-receptor in an information device and a larger diameter spot determined by the fundamental wave light vanishes therefrom. Therefore, high-resolution printing and high-density recording can be realized.

DETAILED DESCRIPTION OF PREFERRED EMBODIMENTS

Figure 1:
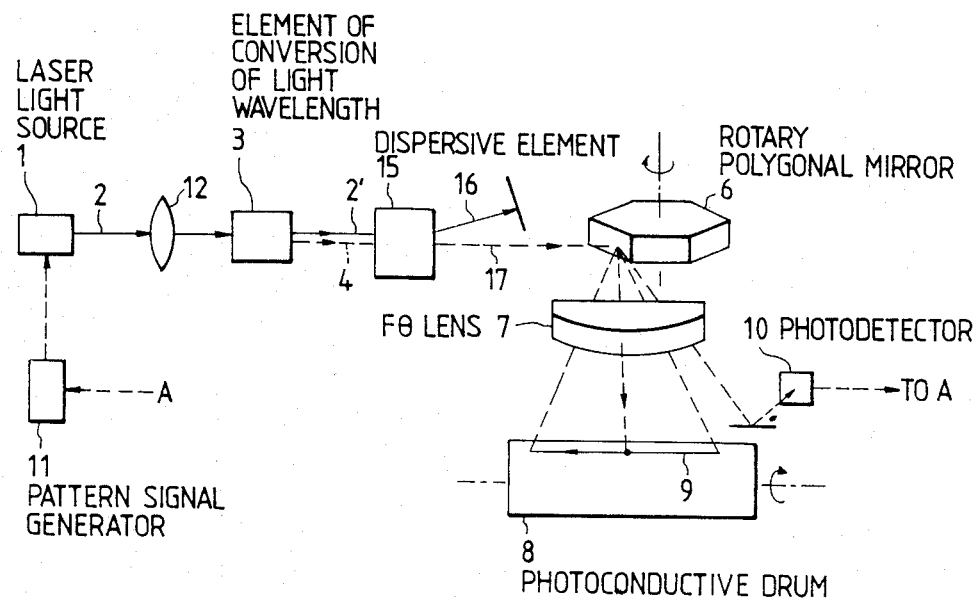
FIG. 1 is an overall structural diagram showing a laser printer according to an embodiment of the present invention.

FIG. 1 is a diagram showing a laser beam printer according to an embodiment of the present invention. A fundamental wave light beam 2 with wavelength $\lambda_1$ emitted from a laser light source 1 enters an element for conversion of light wavelength 3. Here, a part of the light beam 2 is converted into a second harmonic wave resulting in the generation of a light beam 4 of wavelength $\lambda_2 = \lambda_1/2$. However, since a fundamental wave component 2', which is not converted out of the light beam 2, remains, the components of wavelength of $\lambda_1$ and component of wavelength $\lambda_2$ mingle in the light beam after passing through the element of conversion 3. In the optical path of the fundamental wave component 2' and the second harmonic wave component 4, a dispersive element 15, such as a prism, an optical grating, or the like is provided so that the fundamental wave component light 16 is made to divert from light path 17 and only the second harmonic wave component 4 can be incident onto a rotary polygonal mirror 6 for beam deflection. Then, the second harmonic wave component 4, deflected by the rotary polygonal mirror 6 is focused onto a photo-receptor that is a photoconductive drum 8 in this case, through an F$\theta$ lens, and scans on the photoconductive drum 8. In this case, a scanning beam spot 9 is subjected to the light intensity modulation according to printing patterns. In the modulation of the scanning beam, the fundamental wave light intensity is modulated with a signal generated by a pattern signal generator 11 in synchronism with a signal from a photodetector 10 arranged at an end of a scanning line. A lens 12, shown in FIG. 1 is used for focusing a light beam for improving the efficiency of conversion of light wavelength. The dispersive element 15 may be located at any place in an optical path provided that it is placed behind element 3 for converting light wavelength.

Figure 2:
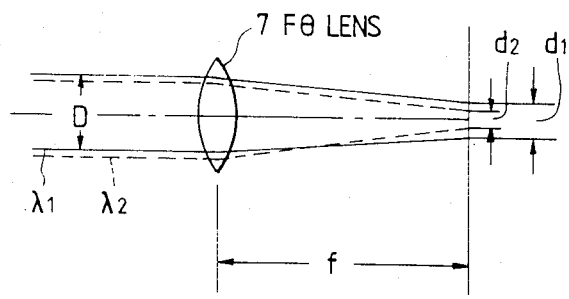
FIG. 2 shows relationships between wavelengths of laser light and diameters of laser light beam spots.

In the aforementioned optical constitution, the following relation can be obtained. Assuming the focal length of the F$\theta$ lens 7 is f for both wavelengths $\lambda_1$ and $\lambda_2$, a diameter of incidence beam is D, and a profile of the beam is a Gaussian distribution, focusing spot diameters of the light beams $d_1$ and $d_2$ corresponding to wavelengths $\lambda_1$ and $\lambda_2$, respectively, become, in case of $\lambda_2 = \frac{1}{2}\lambda_1$, as shown in FIG. 2, $$d_1 = \pi f \lambda_1 / 4D$$

$$d_2 = \pi f \lambda_2 / 4D = \pi f \lambda_1 / 8D$$

From this relation, $d_2$ becomes half of the value of $d_1$.

Therefore, if the light with wavelength $\lambda_1$ and light with wavelength $\lambda_2$ are mixed, an outer diameter of the scanning light beam spot is determined by $d_1$ so that high-resolution printing can not be realized. On the other hand, if the light with wavelength $\lambda_1$ is eliminated, the outer diameter of scanning light beam spot becomes $d_2$; accordingly high-resolution printing is realized.

In the case where the F$\theta$ lens 7 is designed only for the light with wavelength $\lambda_2$, since the light with a wavelength of the other value has a function of lowering the resolution power of a scanning optical system as interference light, elimination of the light with $\lambda_1$ is desirable for realizing high-resolution. Additionally, the timing accuracy of the signal from the photodetector 10, which determines the timing accuracy of the sending of the printing pattern signal, may be improved further as the diameter of the scanning light beam spot becomes smaller, thus being effective in high-resolution printing.

Figure 3:
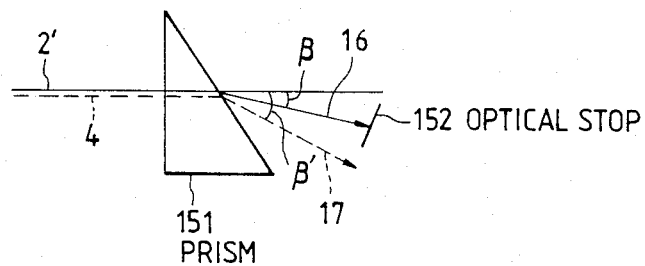
FIG. 3 shows an example of a prism used as a dispersive element in the laser printer shown in FIG. 1.

FIG. 3 shows how to separate the light of the fundamental wave component and the harmonic wave light using a prism 151 as the dispersive element 15. In this case, the fact that an angle of deviation $\beta$ in relation to the incident beam direction depends upon the wavelength of light, is utilized. In this case the harmonic wave light 4 proceeds along an optical path 17. However, the fundamental wave light 2' deviates from the optical path 17 and goes along an optical path 16 and is cut off by the optical stop 152. Therefore, only the harmonic wave light can be irradiated to the photo-receptor.

Figure 4:
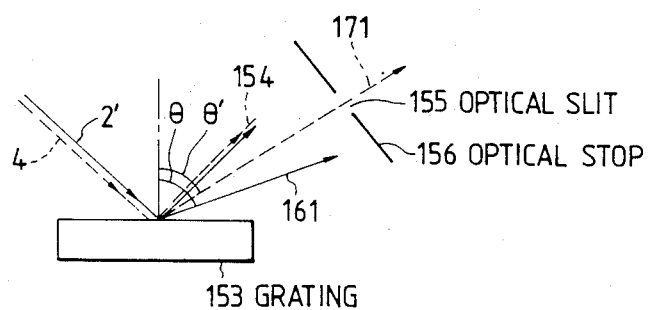
FIG. 4 shows an example of an optical grating used as a dispersive element in the laser printer shown in FIG. 1.

FIG. 4 shows how to separate the light of fundamental wave component and the harmonic wave light using an optical grating 153 as the dispersive element 15. In this case, the fact that an angle of diffraction $\theta$ by an optical grating depends on the wavelength of light, is utilized. In this case when the fundamental wave light 2' and the second harmonic wave light 4 are irradiated onto a reflection type grating 153, the grating 153 and an optical stop 156 with an optical slit 155 are arranged in a manner such that only the first order diffracted light 171 of the second harmonic wave light may pass through the slit 155. On the other hand zeroth order diffracted light or non-diffracted light 154 including both of the fundamental wave light and second harmonic wave light and the first order diffracted light 161 of the fundamental wave light are cutoff. This allows only the second harmonic wave light 171 to reach the photo-receptor.

Figure 5:
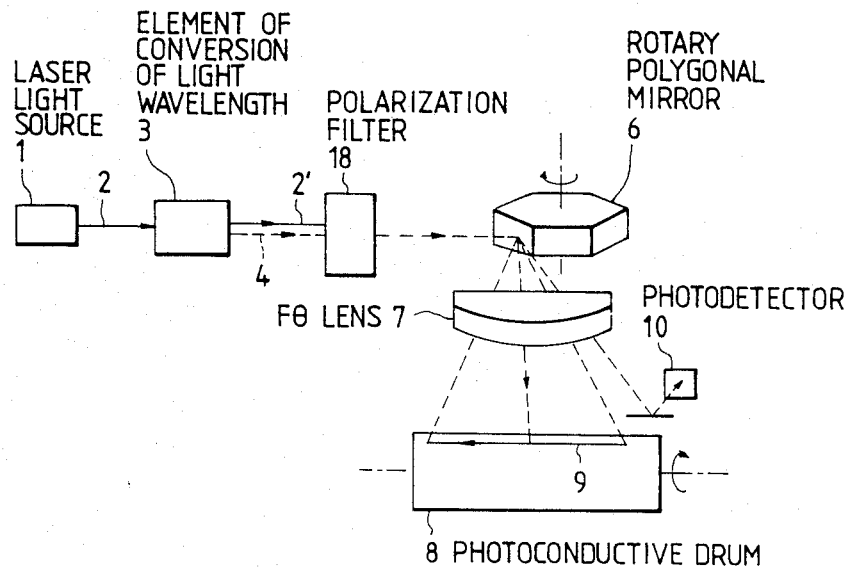
FIG. 5 is an overall structural diagram showing a laser printer according to another embodiment of the present invention.

FIG. 5 is a diagram showing a laser printer according to another embodiment of the present invention. In this embodiment, by utilizing the principle that linear polarization directions of the fundamental wave light and the harmonic wave light are different from each other, the fundamental wave light is separated from the second harmonic wave light so that the fundamental wave light does not reach either the photoconductive drum 8 or the photodetector 10. Generally, the relation between the components of non-linear polarization P by which the second harmonic wave is generated and the electric field components of the light incident upon a non-linear optical crystal is expressed in a tensor as shown in the following. (These are described in the following in detail: S. Singh, "Non-Linear Optical Materials", Handbook of Lasers with Selected Data on Optical Technology, pp. 489–492, edited by R. J. Pressley; published by the Chemical Rubber Co., 1971, for example)

$$\begin{pmatrix} P_x \\ P_y \\ P_z \end{pmatrix} = \begin{pmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{pmatrix} \begin{pmatrix} E_x^2 \\ E_y^2 \\ E_z^2 \\ 2E_yE_z \\ 2E_zE_x \\ 2E_xE_y \end{pmatrix}$$

Where, $d_{11}$, $d_{12}$,—are coefficients indicating the proportion of generation of non-linear polarization due to the incident light and depend on the direction of propagation, polarization of the electric field and orientation of the optic axis of the non-linear optical crystal. These coefficients take different value according to the respective crystals, and some of them takes the value of 0. The aforementioned relation proves that the linear polarization directions of the incident light and second harmonic wave component do not always coincide with each other.

In this embodiment, in the rear stage of the element for conversion of light wavelength 3, that is the non-linear optical crystal, a polarization filter 18 is placed in a manner such that the fundamental wave light 2' is blocked and only the harmonic wave light 4 may pass through the filter 18, depending on the difference of the polarization directions between the both light waves.

Because this difference between both of the linear polarization directions is determined by the respective crystals, the polarization filter 18 is arranged in such optimum direction so as to transmit only the harmonic wave light 4.

For example, in the case of $LiNbO_3$ which is frequently used for generating the second harmonic wave, the non-linear coefficients are shown below as matrix.

$$\begin{pmatrix} 0 & 0 & 0 & 0 & d_{15} & -d_{22} \\ -d_{22} & d_{22} & 0 & d_{15} & 0 & 0 \\ d_{31} & d_{31} & d_{33} & 0 & 0 & 0 \end{pmatrix}$$

Components of non-linear polarization are expressed as follows.

$Px = 2d_{15}EzEx - 2d_{22}ExEy$ $Py = -d_{22}Ex^2 + d_{22}Ey^2 + 2d_{15}EzEy$ $Pz = d_{31}Ex^2 + d_{31}Ey^2 + d_{33}Ez^2$

Figure 6:
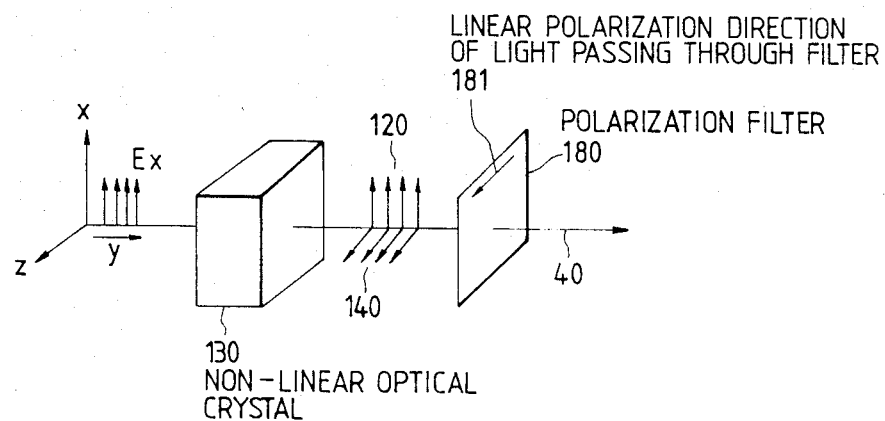
FIG. 6 shows examples of a non-linear optical crystal and a polarization filter used in the laser printer shown in FIG. 5.

From the above relation, as shown in FIG. 6, when a $LiNbO_3$ crystal 130 having a large non-linear optical coefficient $d_{\bar{3}1}$ (=4.76(1/9×10$^{-22}$ mks)) is used, the linear polarization direction of the produced second harmonic wave light 140 is the z-axis direction when the relative position of the crystal and fundamental wave light is set in a manner such that the incident direction of the fundamental wave light is in the y-axis direction and the linear polarization direction of the fundamental wave light 120 remains in the x-axis direction after passing through the crystal 130, only second harmonic wave light is in x-axis direction (Ex). Since the linear polarization direction of fundamental wave light 40 can pass through the polarization filter 180 whole linear polarization direction 181 of light passing through is in the z-direction, thereby separating the fundamental wave from the second harmonic wave.

The operation of the embodiment shown in FIG. 5 is the same as that concerning the embodiment shown in FIG. 1.

Figure 7:
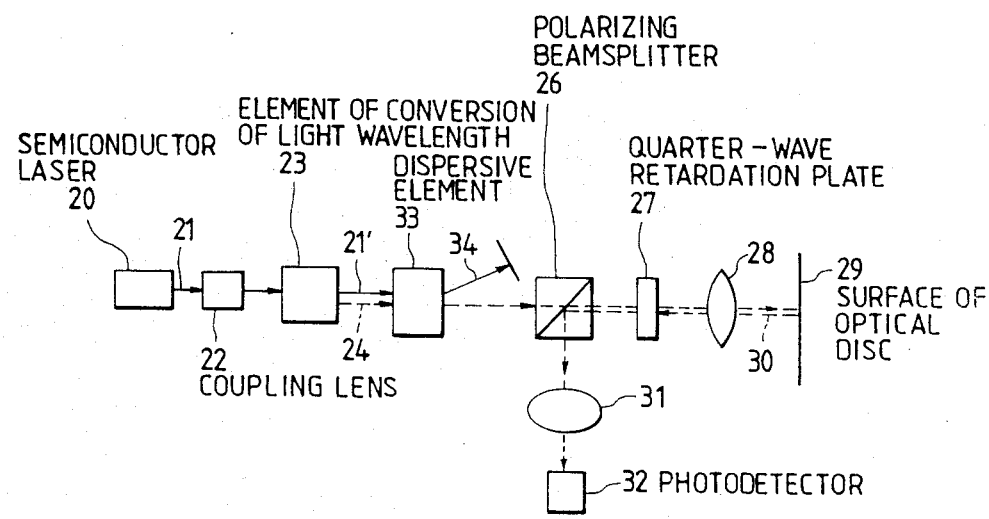
FIG. 7 is a diagram showing an optical disc device according to a third embodiment of the present invention.

FIG. 7 shows an embodiment when the present invention is applied to an optical disc device. The output light (fundamental wave light) 21 from a semiconductor laser 20 enters an element for conversion of light wavelength 23 after passing through coupling lens 22. Here a part of the fundamental wave light is converted into second harmonic wave light 24, and the light 24 goes out together with the fundamental wave component 21' which is not converted, from the element 23. A dispersive element 33 such as a prism or an optical grating is placed near an exit of the element 23 to change the direction of progress 34 of only the fundamental wave light component 21 included in the light beam passing through the element of conversion of light wavelength 23, diverting it from the optical path, thereby focusing only the second harmonic wave light on a surface of an optical disc 29 as a photoreceptor after it passes through a polarizing beamsplitter 26, a quarter-wave retardation plate 27 and a focusing lens 28. With this focused light beam, information is written on or read from the disc surface. For reading data, reflecting light 30 from the surface is separated by the polarization beamsplitter 26 and is transmitted to photodetector 32 through focusing lens 31. In the above optical system, only the second harmonic wave light, whose wavelength is half of the fundamental wave light, is used. This permits high-density recording and high-precision reading.

Figure 8:
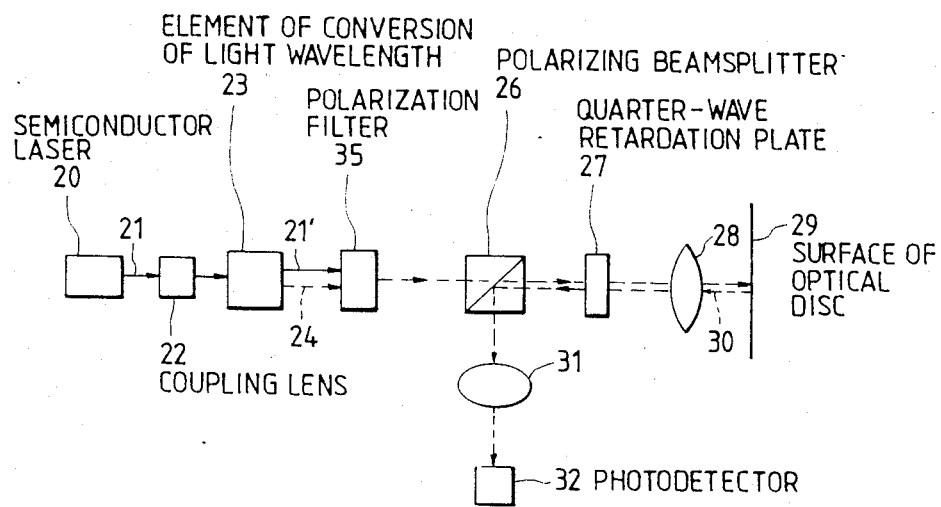
FIG. 8 is a diagram showing an optical disc device according to the other embodiment of the present invention.

FIG. 8 shows another embodiment of the present invention applied to an optical disc device. In this case, fundamental wave light is prevented from reaching the surface of the optical disc 29 by utilizing the fact that there is a difference in polarization direction between the fundamental wave light and second harmonic wave light. For that purpose, a polarization filter 35 is arranged near the output port for the element of conversion of light wavelength 23 so as to pass only the second harmonic wave light component. The polarization directions of the fundamental wave light and second harmonic wave light depend on the element of conversion of light wavelength used in the embodiment. Accordingly, in consideration of this relation and the polarization characteristic of polarization beamsplitter 26, the optical system is designed to allow only the second harmonic wave light component to reach the surface of the optical disc 29.

When the present invention is applied to an optical disc device, it is naturally possible to use an light focusing element such as a lens and an optical wave-guide element between the laser oscillator and the element of conversion of light wavelength with the purposes of increasing of the energy density of fundamental wave light and raising the wavelength conversion efficiency, though this is not shown in this embodiment.

The present invention can effectively realize high-resolution printing and high-density recording when the output light from the laser oscillator undergoes wavelength conversion to obtain second harmonic wave light which is utilized for printing or recording on an information device.

The cases of a laser printer and an optical disc device have been described as embodiments of the present invention. However, this is also applicable to other information devices.

We claim:

1. An information device using laser light, comprising:
   a laser light source;
   a conversion element for converting laser fundamental wave light irradiated from said laser light source into harmonic wave light;
   a photo-receptor for receiving laser light passing through said conversion element; and
   a dispersive element which is provided in an optical path between said conversion element and said photo-receptor and separates an optical path of the fundamental wave light remaining in said laser light passing through said conversion element from an optical path of the harmonic wave light so as to allow the harmonic wave light to reach said photo-receptor but not to allow the fundamental wave light to reach said photo-receptor.

2. An information device according to claim 1, wherein said dispersive element is comprised of a prism.

3. An information device according to claim 1, wherein said dispersive element is comprised of an optical grating.

4. An information device using laser light, comprising:
   a laser light source;
   a conversion element for converting laser fundamental wave light irradiated from said laser light source into harmonic wave light;
   a photo-receptor for receiving laser light passing through said conversion element; and
   a polarization filter which is provided in an optical path between said conversion element and said photo-receptor that has a polarization characteristic that allows the harmonic wave light to pass but does not allow the fundamental wave light remaining in said laser light passing through said conversion element to pass.

5. An information device according to claim 4, wherein said conversion element is comprised of a non-linear optical crystal which converts laser fundamental wave light incident thereupon into second harmonic wave light so as to make a polarization direction of the fundamental wave light and that of the second harmonic wave light orthogonal with each other, and said polarization filter having a polarization characteristic that allows the second harmonic wave light to pass but does not allow the fundamental wave light to pass.

6. A laser printer comprising:
   a laser light source;
   a conversion element for converting laser fundamental wave light irradiated from said laser light source into harmonic wave light;
   a photoconductive drum scanned with laser light passing through said conversion element; and
   a dispersive element which is provided in an optical path between said conversion element and said photoconductive drum and separates an optical path of the fundamental wave light remaining in said laser light passing through said conversion element from an optical path of the harmonic wave light so as to allow the harmonic wave light to reach said photoconductive drum but not to allow the fundamental wave light to reach said photoconductive drum.

7. A laser printer according to claim 6, wherein said dispersive element is comprised of a prism.

8. A laser printer according to claim 6, wherein said dispersive element is comprised of an optical grating.

9. A laser printer comprising:
   a laser light source;
   a conversion element for converting laser fundamental wave light irradiated from said laser light source into harmonic wave light;
   a photoconductive drum scanned with laser light passing through said conversion element; and
   a polarization filter which is provided in an optical path between said conversion element and said photoconductive drum and has a polarization characteristic that allows the harmonic wave light to pass but does not allow the fundamental wave light remaining in said laser light passing through said conversion element to pass.

10. A laser printer according to claim 9, wherein said conversion element is comprised of a non-linear optical crystal which converts laser fundamental wave light incident thereupon into second harmonic wave light so as to make a polarization direction of the fundamental wave light and that of the second harmonic wave light orthogonal with each other, and said polarization filter has a polarization characteristic that allows the second harmonic wave light to pass but does not allow the fundamental wave light to pass.

11. An optical disc device comprising:
   a laser light source;
   a conversion element for converting laser fundamental wave light irradiated from said laser light source into harmonic wave light;
   an optical disc into or from which information is written or read out with laser light passing through said conversion element; and
   a dispersive element which is provided in an optical path between said conversion element and said optical disc and separates an optical path of the fundamental wave light remaining in said laser light passing through said conversion element from an optical path of the harmonic wave light so as to allow the harmonic wave light to reach said optical disc but not to allow the fundamental wave light to reach said optical disc.

12. An optical disc device according to claim 11, wherein said dispersive element is comprised of a prism.

13. An optical disc device according to claim 11, wherein said dispersive element is comprised of an optical grating.

14. An optical device comprising:
   a laser light source;
   a conversion element for converting laser fundamental wave light irradiated from said laser light source into harmonic wave light;
   an optical disc into or from which information is written or read out with laser light passing through said conversion element; and
   a polarization filter which is provided in an optical path between said conversion element and said optical disc and that has a polarization characteristic that allows the harmonic wave light to pass but does not allow the fundamental wave light remaining in said laser light passing through said conversion element to pass.

15. An optical device according to claim 14, wherein said conversion element is comprised of a non-linear optical crystal which converts laser fundamental wave light incident thereupon into second harmonic wave light so as to make a polarization direction of the fundamental wave light and that of the second harmonic wave light orthogonal with each other, and said polarization filter having a polarization characteristic that allows the second harmonic wave light to pass but does not allow the fundamental wave light to pass.

* * * * *